Figure 1:
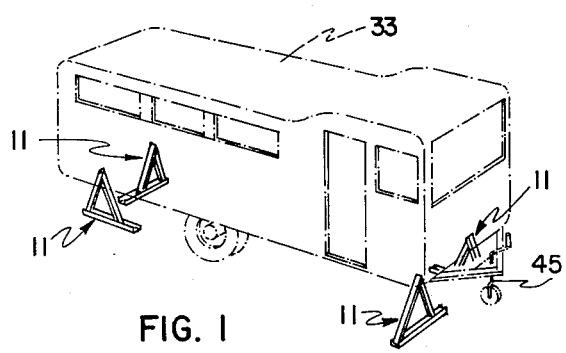

Sept. 28, 1965  C. R. BEESON  3,208,712

SUPPORT STAND

Filed April 17, 1963

INVENTOR.
CHESTER R. BEESON

BY

ATTORNEY

United States Patent Office 3,208,712
Patented Sept. 28, 1965

3,208,712
SUPPORT STAND
Chester R. Beeson, 2734 W. 33rd St., Denver, Colo.
Filed Apr. 17, 1963, Ser. No. 273,756
1 Claim. (Cl. 248—423)

The present invention relates to an adjustable support stand particularly adapted to hold and support trailers, campers, canopies and the like in desired position above a ground support.

In general, the invention is provided so that trailers and similar vehicles may be securely supported and held in desired positions against forces tending to move the vehicles from such position. When so used, the supports further provide adjustable positioning to maintain a vehicle or trailer in level orientation above uneven ground supports.

Previously, the users of trailers and similar vehicles have fully recognized the necessity for providing an adequate and strong support for holding the vehicles in desired position as against the forces of winds or the forces resulting from movement of personnel and equipment within such vehicles. The common solution at the present time involves the use of bricks, blocks, cribbing and wedges so that the underframe of such vehicles may be adequately supported.

Since the type of vehicles described are inherently of a portable or removable nature, it has been found that the location, transportation and repositioning of present type supports represents a major inconvenience, if not a major problem, when it is desired to move such vehicles.

Fully realizing the nature and scope of the problem, the present invention is intended to provide a solution thereto by means of the provision of multiple adjustable support stands capable of satisfying the following objectives:

The first objective of the present invention is the provision of a support stand which is adjustable and sturdy when extended for use but which may be stored conveniently and compactly when in the collapsed condition.

Another object of the present invention is to provide a stand of the foregoing type which permits adjustments in the relative height of individual stands so that a plurality of stands may be applied under a vehicle to provide adequate support irrespective of uneven ground support contours.

Another object of the present invention is to provide a stand of lightweight and compact construction which will adequately serve to hold and support such vehicles.

A further object of this invention is to provide a stand which may be readily positioned or removed by inexperienced personnel.

A still further object of this invention is to provide an "A-frame" type of support stand which incorporates a bottom plate providing for secure and adjustable positioning of the A-frame units.

Another object of this invention is the provision of a support stand that is of construction such that it may be used together with other similar support stands to securely hold and support the mentioned vehicles so that the desired positioning will not be disturbed by the movements of personnel and equipment within such vehicles or by external forces, such as the wind, when applied at varied positions around the vehicle.

Figure 4:
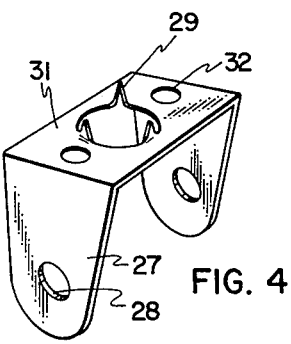
Figure 2:
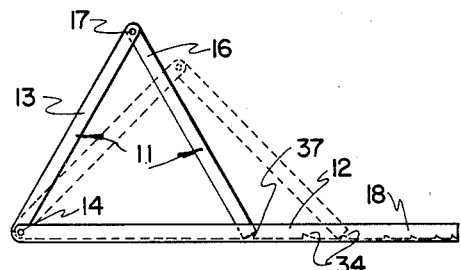
Figure 3:
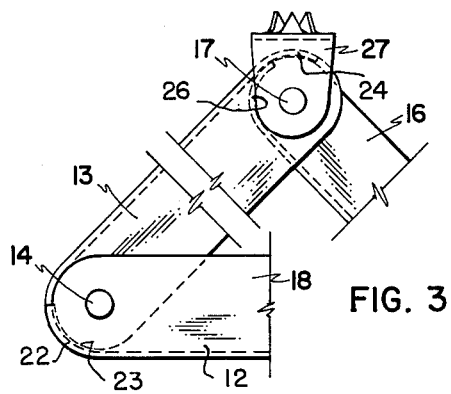
Figure 5:
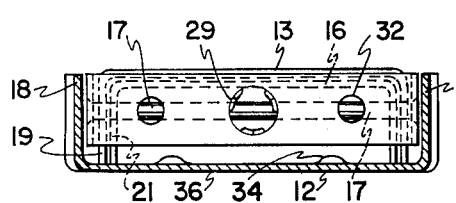
Figure 6:
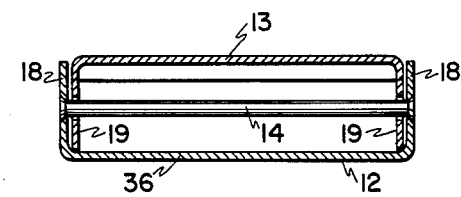
Figure 7:
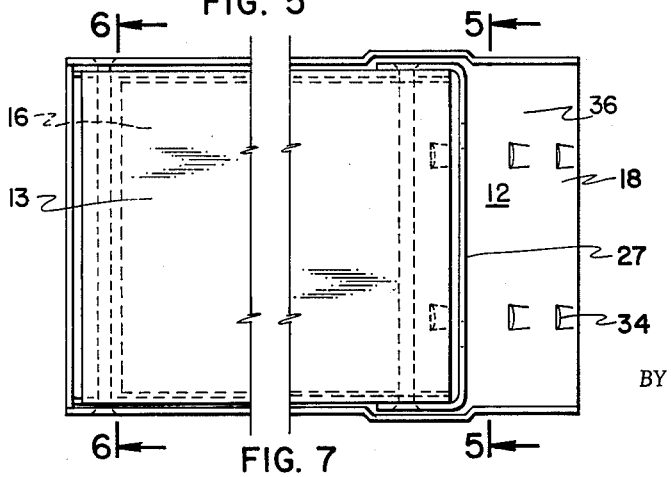

Further and additional features of the present invention will be apparent from the appended description and drawings, in which FIG. 1 is a perspective drawing in partial outline illustrating various features of the invention, FIG. 2 is a side elevation showing alternate positions for an embodiment of the invention, FIG. 3 is an enlarged detail showing features of the hinged structures, FIG. 4 is a perspective illustration showing a top connector plate, FIG. 5 is an elevation along the line 5—5 of FIG. 7 showing components of the invention in compact nested position, FIG. 6 is an elevation along the line 6—6 of FIG. 7 further showing details of a nested unit, and FIG. 7 is a top plan view in partial broken section illustrating additional features of the invention.

Briefly stated, the present invention provides an "A-frame" support together with a base stand or bottom plate in which all of the parts are of cooperative design and arrangement so that the parts in their collapsed condition may be nested one within the other. These same parts when in the extended position with the supports above the bottom plate or stand provide a strong and sturdy support that is adjustable in height. As additional features, embodiments of the invention further provide pivot pins, and supplementary mating curved surfaces that are cooperatively formed so that the load can be carried by structural elements of inherently strong design. By reason of the separate unit design, a plurality of the units may be used cooperatively to provide non-yielding support for a vehicle or the same plurality of units may be kept and stored together as a compact package when not in use.

The detailed features of an embodiment of this invention will perhaps be best understood with reference to the accompanying figures, in which FIGURES 2, 3 and 4 show the main details of the invention. As therein illustrated, it will be noted that the invention provides a support stand 11 which in its raised position provides and utilizes a base 12, a first or back leg 13 pivotally secured to the base 12 by means of a pivot pin 14, and a front leg 16 which is likewise pivotally secured to the back leg 13 by means of a pivot pin 17. All of the separate members 12, 13 and 16 are of channel shape. The flanges 18 of the base 12 are disposed upwardly and serve to enclose all of the elements when such elements, inclusive of the back and front legs 13 and 16, are in the nested relationship, as shown in FIGURE 5. The side flanges 19 and 21 of the back and front legs 13 and 16, respectively, are disposed downwardly when in the nested position.

As shown in FIGURE 3, the pivots 14 and 17 which extend through the side flanges of their respective joined pieces are aided in their pivoting and support function through the provision of the rounded and cooperatively mating end curves 22 and 23, and 24 and 26, as shown in FIGURE 3. These cooperatively mating curved surfaces help to transmit load forces from the back and front legs 13 and 16. With such structure a substantial load is taken off the pivots 14 and 17, and accordingly these elements and their points of connection with the respective side flanges will not be overloaded. When the loading in back leg 13 is transmitted from end curve 23 to the cooperatively formed end curve 22, the otherwise high sheer stress in pivot pin 14 will be relieved. Accordingly, the pivot pins 14 and 17 need not be of such size to withstand the full sheer forces that may be encountered.

The connector plate 27 which may be provided at the juncture of the legs 13 and 16 and which preferably may be secured in such place by extending the pivot 17 through the openings 28 provided in such plate is used so that a more secure attachment may be made between the support stands 11 and any trailer 33 or similar vehicle. A plurality of tabs 29 may be provided in the upper surface 31 of the connector plate 27, or a plurality of openings 32 may be provided so that the connector plate may be securely joined to the trailer or similar vehicle 33.

When it is desired to use the support stand units 11, the connector plate will be brought into engagement with the underneath side of such vehicle, and thereafter the unit will be unfolded from its nested position to bring the legs 13 and 16 into tripod or "A-frame" configuration above the base 12.

Since a plurality of struck catches 34 are provided in the bottom surface 36 of the base 12 and since these catches 34 are adapted to engage the lower terminal edge 37 of the front leg 16, a considerable variety of extension heights for the support unit is possible. Because of the "A-frame" configuration and of the changes in intersecting angles, the spacing of the catches 34 is preferably uneven along the length of the base 12. The uneven disposition illustrated corresponds to the relative positions necessary to obtain even increments in the adjusted total height of the support unit 11. In manufactured units the spacing of the catches 34 will preferably be varied to provide approximate ½ inch increments in such adjusted height.

This adjusting feature and the inherent strength characteristics of the "A-frame" type support make it well suited for use in connection with trailers and vehicles of the type described. A single support unit 11 may be used to support the forward end of a trailer, or two or more of such units may be used to provide rigid and secure support for the vehicle. FIGURE 1 illustrates the cooperative use of four support units 11 to provide full support for a trailer vehicle 33. When four support units 11 are used, it is desirable that the units be disposed in the arrangement illustrated so that the ends corresponding to the pivot 14 are successively positioned in four separate directions around the base frame of the vehicle. When positioned in this manner, the support units provide a stable vehicle and the forces of personnel walking inside the vehicle or the external forces of wind and weather are adequately countered.

The further fact that the support units may be easily and readily installed in such positions represents a further advantage inherent in the present invention. When these support units are used, no extra or supplementary tools and no blocks and shims are required. Once the vehicle has been moved to the desired physical position, the support units may be installed by first lowering the front trailer support and wheel 45. With the front of the vehicle lowered the rear support units 11 are installed with adjustment being made for the existing unevenness of terrain. Next, the front support and wheel 45 is raised to an extended position, and the front support units are similarly installed. With this arrangement the weight of the trailer vehicle can actually be fully removed from the tires and springs to fully eliminate any swaying tendency of the vehicle due to the action of such resilient members.

When the vehicle is to be moved to another location, the process is, of course, reversed, and the support units are removed and folded into their nested compact relation for easy storage in receptacles that may be placed on the forward draw bar of the vehicle or in position of storage within the vehicle. With the cooperation of the vehicle manufacturers or as a separate accessory, means may be provided on the vehicle frame at each of the corners thereof for the permanent emplacement of the support units. Such emplacement could provide auxiliary catches for holding the support units in their compact nested arrangement.

While separate embodiments of the invention have been shown and described, it should be apparent that the invention is adaptable to various modifications and changes. All such modifications as come within the scope of the hereunto appended claim are considered to be a part of this invention.

What is claimed is:

An adjustable support unit for vehicles that is adapted for compact storage when not in support use comprising a channel base member having upwardly turned flanges, mating curved surfaces at one end of said base, a back leg of size for nesting engagement within said base having mating curved surfaces on a first end thereof for cooperative pivoting engagement with said named mating curved surfaces to facilitate movement of said back leg to alternate positions of use above said base and nested therewithin, mating curved surfaces on the opposite end of said back leg, a front leg of size for nesting engagement within said base and a back leg having mating curved surfaces thereon for cooperative engagement with the second named mating curved surfaces on said back leg to facilitate movement of said front leg to alternate positions of use above said base and nested therewithin, and pivot pins adjacent said mating curved surfaces and concentric therewith for holding said elements each to each with said cooperative mating curved surfaces providing direct engagement between said named elements for the efficient transmission of support forces from one element to the other without exertion of excessive loadings on said pivot pins.

References Cited by the Examiner

UNITED STATES PATENTS

| | | | |
|---|---|---|---|
| 2,144,303 | 1/39 | Wiedman | 254—126 |
| 3,058,706 | 10/62 | Snell | 248—27.8 |
| 3,090,600 | 5/63 | Smith | 254—116 |

CLAUDE A. LE ROY, *Primary Examiner.*